United States Patent
Paranthaman et al.

(10) Patent No.: US 11,117,121 B2
(45) Date of Patent: Sep. 14, 2021

(54) PRODUCTION OF BIOFUELS WITH NOVEL SALTS IMPREGNATED TIRE-DERIVED CARBON CATALYSTS

(71) Applicants: UT-Battelle, LLC, Oak Ridge, TN (US); Georgia Institute of Technology, Atlanta, GA (US); Wake Forest University, Winston-Salem, NC (US)

(72) Inventors: Mariappan Paranthaman, Knoxville, TN (US); Amit K. Naskar, Knoxville, TN (US); Abdou Lachgar, Winston-Salem, NC (US); Younan Xia, Atlanta, GA (US); Zachary David Hood, Atlanta, GA (US); Shiba Prasad Adhikari, Winston-Salem, NC (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/016,704

(22) Filed: Jun. 25, 2018

(65) Prior Publication Data
US 2018/0369791 A1     Dec. 27, 2018

Related U.S. Application Data

(60) Provisional application No. 62/524,831, filed on Jun. 26, 2017, provisional application No. 62/635,578, filed on Feb. 27, 2018.

(51) Int. Cl.
| | | |
|---|---|---|
| *B01J 27/053* | (2006.01) |
| *B01J 37/02* | (2006.01) |
| *B01J 37/08* | (2006.01) |
| *B01J 37/34* | (2006.01) |
| *B01J 35/10* | (2006.01) |
| *C11C 3/00* | (2006.01) |
| *B01J 35/00* | (2006.01) |
| *C10B 53/07* | (2006.01) |

(52) U.S. Cl.
CPC ......... *B01J 27/053* (2013.01); *B01J 35/002* (2013.01); *B01J 35/1009* (2013.01); *B01J 35/109* (2013.01); *B01J 35/1028* (2013.01); *B01J 35/1038* (2013.01); *B01J 35/1061* (2013.01); *B01J 37/0207* (2013.01); *B01J 37/084* (2013.01); *B01J 37/343* (2013.01); *C11C 3/00* (2013.01); *C11C 3/003* (2013.01); *B01J 2523/62* (2013.01); *B01J 2523/842* (2013.01); *C10B 53/07* (2013.01)

(58) Field of Classification Search
None
See application file for complete search history.

(56) References Cited

U.S. PATENT DOCUMENTS

| | | | |
|---|---|---|---|
| 9,884,804 B2 | 2/2018 | Hood et al. | |
| 2010/0291167 A1* | 11/2010 | Iida | A61K 8/19 424/401 |
| 2014/0272592 A1* | 9/2014 | Thompkins | H01M 4/386 429/231.8 |

OTHER PUBLICATIONS

M. Boota, et al., "Waste Tire Derived Carbon-Polymer Composite Paper as Pseudocapacitive Electrode with Long Cycle Life," ChemSusChem 2015, pp. 3576-3581, vol. 8.

(Continued)

*Primary Examiner* — Guinever S Gregorio
(74) *Attorney, Agent, or Firm* — Fox Rothschild LLP (57) ABSTRACT

The invention provides a catalyst and a method for making the catalyst. The catalyst comprises a porous carbon composite impregnated with a salt. The catalyst comprises a porous carbon composite impregnated with a salt.

10 Claims, 11 Drawing Sheets

(56) References Cited

OTHER PUBLICATIONS

M. Canakci and J. Van Gerpen, "Biodiesel Production From Oils and Fats With High Free Fatty Acids," Transactions of the ASAE, 2001, pp. 1429-1436, vol. 44, Issue 6.
Chinmay A. Deshmane, et, al., "A Comparative Study of Solid Carbon Acid Catalysts for the Esterification of Free Fatty Acids for Biodiesel Production. Evidence for the Leaching of Colloidal Carbon," Bioresource Technology, 2013, pp. 597-604, vol. 147.
Kathlene Jacobson, et al., "Solid Acid Catalyzed Biodiesel Production from Waste Cooking Oil," Applied Catalysis B: Environmental, 2008, pp. 86-91, vol. 85.
Amit K. Naskar, et al., "Tailored recovery of carbons from waste tires for enhanced performance as anodes in lithium-ion batteries," RSC Adv., 2014, pp. 38213-38221, vol. 4.
Bao-Xiang Peng, et al., "Biodiesel Production from Waste Oil Feedstocks by Solid Acid Catalysis," Process Safety and Environment Protection, 2008 pp. 441-447, vol. 86.
Yahaya Muhammad Sani, et al., "Activity of Solid Acid Catalysts for Biodiesel Production: A Critical Review," Applied Catalysis A: General, 2014, pp. 140-161, vol. 470.
Qing Shu, et al., "Synthesis of Biodiesel from Waste Vegetable Oil with Large Amounts of Free Fatty Acids Using a Carbon-Based Solid Acid Catalyst," Applied Energy, 2010, pp. 2589-2596, vol. 87.
Masakazu Toda, et al., "Biodisel Made with Sugar Catalyst," Nature, 2005, pp. 178, vol. 438.
Yong Wang, et al., "Comparison of Two Different Processes to Synthesize Biodiesel by Waste Cooking Oil," Journal of Molecular Catalysis A: Chemical, 2006, pp. 107-112, 252.
Mariappan Paranthaman, et al., U.S. Appl. No. 15/961,978, filed Apr. 25, 2018.

\* cited by examiner

PRODUCTION OF BIOFUELS WITH NOVEL SALTS IMPREGNATED TIRE-DERIVED CARBON CATALYSTS

RELATED APPLICATIONS

This application asserts the priority of U.S. Provisional Application Ser. No. 62/524,831 filed on Jun. 26, 2017 and U.S. Provisional Application Ser. No. 62/635,578 filed on Feb. 27, 2018, the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

This invention generally relates to the field of carbon catalysis and to methods for the production of biofuels. The invention relates, more particularly, to salt impregnated tire carbon catalysts, and their use for converting free fatty acids to fatty acid methyl esters.

BACKGROUND OF THE INVENTION

Solid acid heterogeneous catalysts are subject of intense study for their application to synthesizing biofuels from low-quality feedstocks containing free fatty acids (FFAs). Such feedstocks, originating from waste cooking oils or animal fats, contain >20% of FFAs that undergo undesired saponification in the presence of a strong base such as KOH during typical biofuel production. Even though sulfuric acid can be exploited to convert unwanted FFAs to fatty acid methyl esters (FAMEs), it is clear that sulfuric acid causes undesired problems such as environmental pollution and equipment corrosion.

Following earlier attempts at creating efficient solid acid catalysts, multiple research groups synthesized different sulfonated materials, including sugars, single-walled carbon nanotubes, polymers, silica, and biomass, for the conversion of FFAs to FAMEs. Some of these catalysts have shown their tendency to leach catalytically active acid sites, which reduces their activity towards esterification. Surface functionalization of these carbon-based catalysts has largely utilized toxic reagents, including sulfuric acid, urea, chlorosulfonic acid, amongst other environmentally harmful chemicals.

Thus, there exists a need for an environmentally-benign solid acid catalyst with high activity towards FFA to FAME conversion.

SUMMARY OF THE INVENTION

These and other objectives have been met by the present invention, which provides, in one aspect, a catalyst. The catalyst comprises a porous carbon composite impregnated with a salt.

In another aspect, the invention provides a method for making a catalyst. The method comprises providing rubber pieces, optionally contacting the rubber pieces with a sulfonation bath to produce sulfonated rubber, pyrolyzing the rubber pieces or sulfonated rubber to produce a rubber-derived porous carbon composite, and impregnating the porous carbon composite with a salt to produce a catalyst comprising a porous carbon composite impregnated with a salt.

In a further aspect, the invention provides a method for converting free fatty acids to fatty acid methyl esters. The method comprises reacting free fatty acids with a catalyst comprising a porous carbon composite impregnated with a salt.

For a better understanding of the present invention, together with other and further advantages, reference is made to the following detailed description, and its scope will be pointed out in the subsequent claims.

BRIEF DESCRIPTION OF THE FIGURES

FIGS. 2A-2H. 2A) XRD patterns and 2B) $N_2$ adsorption-desorption isotherms of tire carbon and the FS/TC catalysts. 2C) SEM images of the tire carbon. 2D) SEM image of TC with FS, and 2F, 2G, and 2H show EDS elemental mappings of the TC/FS-10 catalyst (EDS scale bar=10 µm).

DETAILED DESCRIPTION OF THE INVENTION

In one aspect, the invention provides a catalyst comprising a porous carbon composite impregnated with a salt, and also provides a method for making the catalyst. In one embodiment, the porous carbon composite component of the catalyst is made from waste tires or other rubber sources. The method comprises providing rubber pieces and optionally contacting the rubber pieces with a sulfonation bath to produce sulfonated rubber. The rubber pieces can include carbon black filled crosslinked rubber chunks. Carbon black is amorphous or noncrystalline.

In one embodiment, the rubber pieces are contacted with a sulfonation bath to provide sulfonated rubber. The method of sulfonating the rubber can vary. In one embodiment, the temperature of the sulfonation bath can be between −20° C. to 200° C. The rubber pieces can be contacted with the sulfonation bath for between 30 minutes and 5 days. The sulfonation bath can include a concentration of sulfuric acid, or fuming sulfuric acid, or chlorosulfonic acid, or $SO_3$ gas containing fluid that is suited to the rubber composition and the conditions of the sulfonation.

The rubber pieces can be any suitable size, such as between 100 nm and 2 inches. The rubber pieces can comprise rubber particles of between 100 nm and 0.5 mm and rubber crumbs of between 0.5 mm to 2 inches.

The rubber pieces or sulfonated rubber pieces are pyrolyzed to produce a rubber (e.g., tire) derived porous carbon composite comprising carbon black embedded in carbon matrix with graphitized interface portions. The graphitized interface portions can comprise 10%-40% of the tire-derived carbon composite, by weight. The graphitized portion can comprise a layer spacing of between 3.5-4.7 angstroms. The presence of the outer graphitized shell preserves the carbon black within and raises yield and provides the correct pore volume characteristics.

The pyrolysis can be conducted by any suitable process. The pyrolyzing can comprise heating to at least 200° C. to 2400° C., or 900° C. to 1200° C. In one embodiment, pyrolysis occurs at about 1100° C. The pyrolyzing can comprise at least two-stage heating. A first stage heating can comprise heating to between room temperature and 400° C. at 1° C./min, and a second stage heating can comprise heating to between 400 and 2400° C. at 2° C./min. The heating rates in both stages can be as high as 50° C./min. The pyrolyzing time can be between 1 min and 24 hours. The pyrolyzing can be conducted in an inert atmosphere, such as under nitrogen gas.

The porous carbon composite contains a mixed meso-microporosity between 1-10 nm or between about 1-5 nm, with both micropores of less than 2 nm, and mesopores of preferably 5-20 nm, or 2-50 nm. In one embodiment, the pores are between 7-18 nm. The pores can have between 70%-90% micropores and between 10%-30% mesopores. The specific surface area of the carbon catalyst is generally between 1-2000 $m^2/g$. In one embodiment, the surface area is in the range of 200-1600 $m^2/g$. The porous carbon composite generally has a pore volume of 0.0100-0.1000 $cm^3\ g^{-1}$.

Next, the rubber-derived porous carbon composite is then activated or impregnated with a salt by contacting the rubber-derived carbon composite with a salt. The salt is generally a transition metal salt. The salt is generally contained within the pores of the carbon composite. The cation component of the salt can be any transition metal. The transition metal can be selected from first-row, second-row, and third-row transition metals. Some examples of first-row transition metal ions include Sc, Ti, V, Cr, Mn, Fe, Co, Ni, Cu, and Zn in their various oxidation states. Some examples of second-row transition metal ions include Y, Zr, Nb, Mo, Ru, Rh, Pd, Ag, and Cd in their various oxidation states. Some examples of third-row transition metal ions include Hf, Ta, W, Re, Ir, Pt, Au, and Hg in their various oxidation states. Some examples of lanthanide metal species include any of the elements in the Periodic Table having an atomic number of 57 to 71, e.g., La, Ce, Pr, Nd, Sm, Eu, Gd, Tb, Dy, Ho, Er, Tm, Yb, and Lu in their known oxidation states. Some examples of actinide metal species include any of the elements in the Periodic Table having an atomic number of 90 to 103, i.e., ions of Th, Pa, U, Np, Pu, and Am. In one embodiment, the transition metal is iron (Fe).

The anion component can be any suitable anion that forms a salt with a transition metal described above. Suitable anions include, but are not limited to, for example, hydride, oxide, hydroxide, sulfide, sulfate, nitride, chelates, fluoride, chloride, phosphate, hydrogen phosphate, nitrate, hydrogen sulfate, nitrite, sulfite, cyanide, peroxide, thiocyanate, acetate, formate, thiosulfate, etc. In one embodiment, the anion component is sulfate ($SO_4^-$).

In another embodiment, the anion component of the salt is present on the surface of the porous carbon composite.

In one embodiment, the salt is iron sulfate, $Fe_2(SO_4)_3$. Iron sulfate is also referred to as ferric sulfate.

Many processes for activating or impregnating carbon are known, and any suitable method can be utilized. The method can comprise contacting the porous carbon composite with a salt described above. The components can be suspended in any suitable aqueous media, such as water or organic media such as alcohol, toluene, hexane, etc. Mild to strong sonication with frequencies, such as, for example, >10 kHz, can be used to disperse the salt into the pores of the carbon support. The sonication time can vary from, for example, 60 sec to a few or several hours. The contacting step can include, for example, mixing, stirring, sonication, annealing, etc. The salt can be mixed with the porous carbon composite at a weight ratio of between, for instance, 0.01-50 wt. %.

After impregnating, the water can be removed by any method known to those skilled in the art. For example, the water can be removed by thermal evaporation, heating, etc.

The porous carbon composite generally can contain a minimum of about 0.1 vol. %. The maximum can be about 50 vol. %. The structure of the catalyst is typically composed of meso/micropores with a granular morphology.

In another aspect, the present invention provides a method for converting free fatty acids to fatty acid methyl esters. The method comprises reacting free fatty acids with a catalyst described above. As used herein, the term "free fatty acid" refers to fatty acids that are unesterified. The term "fatty acid" is used here to generally refer to monocarboxylic acid. Fatty acids are typically understood to mean carboxylic acids which bear a hydrocarbon radical having 1 to 50 carbon atoms. More typically, fatty acids have 4 to 50, in particular 6 to 30 and especially 8 to 24 carbon atoms, for example 12 to 18 carbon atoms.

The free fatty acid may be of natural or synthetic origin. The free fatty acid may further contain substituents, for example halogen atoms, halogenated alkyl radicals, or cyano, hydroxyalkyl, methoxy, nitrite, nitro and/or sulfonic acid groups. The hydroxyalkyl radical can contain only carbon and hydrogen atoms. The hydroxyalkyl radical may be linear, branched or cyclic, and saturated or unsaturated. When unsaturated, they may contain one or more, for example two, three or more, double bonds.

Examples of suitable free fatty acids are, for instance, octanoic acid, decanoic acid, dodecanoic acid, tridecanoic acid, tetradecanoic acid, 12-methyltridecanoic acid, pentadecanoic acid, 13-methyltetradecanoic acid, 12-methyltetradecanoic acid, hexadecanoic acid, 14-methylpentadecanoic acid, heptadecanoic acid, 15-methylhexadecanoic acid, 14-methylhexadecanoic acid, octadecanoic acid, isooctadecanoic acid, eicosanoic acid, docosanoic acid and tetracosanoic acid, and myristoleic acid, palmitoleic acid, hexadecadienoic acid, delta-9-cis-heptadecenoic acid, oleic acid, petroselic acid, vaccenic acid, linoleic acid, linolenic acid, gadoleic acid, gondoleic acid, eicosadienoic acid, arachidonic acid, cetoleic acid, erucic acid, docosadienoic acid and tetracosenoic acid, and also ricinoleic acid, and combination of any of the above mentioned free fatty acids.

Also suitable are free fatty acid mixtures obtained from natural fats and oils, for example cottonseed oil, coconut oil, peanut oil, safflower oil, corn oil, palm kernel oil, rapeseed oil, castor oil, olive oil, mustard seed oil, soybean oil, sunflower oil, and tallow oil, bone oil and fish oil. Likewise suitable fatty acids or fatty acid mixtures for the process according to the invention are tall oil fatty acid, and resin acids and naphthenic acids.

Any free fatty acid can be converted, by the method of the present invention, to fatty acid methyl esters. The method is particularly suitable for the transesterification of fats and/or oils of animal or vegetable origin containing free fatty acids. Free fatty acids are generally soluble in organic solvents, and are typically insoluble in water. Organic solvents in which free fatty acids are soluble are generally non-polar solvents. Examples of non-polar solvents include methanol, ethanol, pentane, cyclopentane, hexane, cyclohexane, benzene, toluene, 1,4-dioxane, chloroform, diethyl ether, methylene chloride, ethyl acetate, d-limonene, heptane, naphtha, and xylene, among others. In one embodiment, the organic solvent is methanol.

The method of converting free fatty acids comprises reacting the free fatty acids dissolved in an organic solvent with a catalyst of the present invention described above to produce fatty acid methyl esters. The free fatty acid can be dissolved in an organic solvent in a minimum molar ratio of 1.0. The maximum molar ratio can be about 40.

The reaction can be carried out in an oil bath. Suitable oils include those described above. The reaction can occur at any temperature. Typically, the reaction can occur between 40° C. to 100° C., more typically between 50° C. to 90°, and even more typically between 60° C. to 80° C.

The reaction can occur for any period of time sufficient to produce the fatty acid methyl ester via a transesterification reaction, typically >0.5 hour.

Surprisingly, the catalyst of the present invention can convert free fatty acids to fatty acid methyl esters in the presence of water of up to about 50 wt. % and/or triglycerides of up to about 90 wt. %.

Examples have been set forth below for the purpose of illustration and to describe certain specific embodiments of the invention. However, the scope of this invention is not to be in any way limited by the examples set forth herein.

EXAMPLES

Example 1

Synthesis of the Ferric Sulfate Solution Impregnated Tire Carbon Catalysts

Waste tire carbons were prepared via pyrolysis. First, tire crumbs were digested in a sulfuric acid bath maintained at 110° C. for about 12 h and the resulting mass was washed with copious amounts of water and then pyrolyzed at 1100° C. under flowing nitrogen gas. The furnace was ramped from 25° C. to 400° C. at a ramp rate of 1° C./min and further increased to 1100° C. at 2° C./min; the furnace was then cooled to room temperature. The resulting carbon yield is up to 50 wt. %. Next, 5, 10, 15 and 20 wt. % ferric sulfate ($Fe_2(SO_4)_3$, Baker Analyzed Reagent, >90%) was mixed with tire carbon by grinding with a mortar and pestle for 5 min. The ferric sulfate+carbon powders were then added to deionized water (5.00 mL of deionized water was added for every 1.0 g of tire carbon) and sonicated for 2 h (Branson 3800). After sonication, the mixture was then stirred overnight, and then the deionized water was removed by thermal evaporation at 100° C.

Example 2

Structural Characterization of the Ferric Sulfate Impregnated Tire Carbon Catalysts X-ray diffraction patterns were collected on a PANalytical X'Pert Pro with a $CuK_\alpha$ X-ray tube. All data were processed with HighScore Plus, a software package supplied by PANalytical. Brunauer-Emmett-Teller (BET) surface area measurements were collected on a Micromeritics Gemini VI Surface Area and Pore Density Analyzer. Scanning electron microscopy (SEM) images were collected on a Zeiss Merlin with a gun acceleration of 10.0 kV. Energy-dispersive x-ray spectroscopy (EDS) elemental mappings were collected with an acceleration voltage of 15.0 kV. X-ray photoelectron spectroscopy (XPS) spectra were collected for each powder sample on a Thermo K-Alpha XPS system with a spot size of 400 μm and a resolution of 0.1 eV.

Example 3

Catalytic Activity of the Ferric Sulfate Impregnated Tire Carbon Catalysts

The conversion of oleic acid (OA) to fatty acid methyl esters (FAMEs) was completed by reacting OA with methanol in a round bottomed flask under reflux with vigorous stirring. The ferric sulfate impregnated tire carbon catalysts were dried at 100° C. prior to all reactions. During the reaction study, a 10:1 molar ratio of methanol to FFA was mixed with 10 wt. % of catalyst (in terms of the FFA content) and the reaction temperature was then maintained at both 60 and 80° C. To test the effect of water on the catalytic activity, the same procedure was followed where distilled deionized water (5, 10, 15, and 20 wt. % with respect to FFA content) was added to the reaction mixture prior to bringing the system to 80° C. The catalytic activity tests varying methanol and the content of each catalyst follow the aforementioned procedure, where the amounts of methanol or catalyst were adjusted while the FFA volume remained constant. For mercury poisoning experiments, one or three drops of mercury were simply added to the reactions prior to heating the mixtures at 80° C.

To determine the content of FFAs and FAMEs in the resulting reaction mixture, GC-MS spectra were collected using an Agilent 7890A GC with 5975C MSD coupled with an Agilent 30 m×0.250 mm, 0.25 μm HP-5MS column. The GC-MS samples were prepared by dispersing 0.4 μL of the reaction mixture in 1.0 mL HPLC grade hexane; 1 μL of this sample was injected via the autosampler and split 50:1 (at a constant 1.2 mL/min He flow rate). The resulting GC-MS spectra were analyzed in MestReNova, where the total ion chromatograms were integrated to determine the percent conversion of OA to methyl oleate.

Example 4

Ferric Sulfate Uniformly Dispersed within the Pores of the Carbon Support

Figure 1:
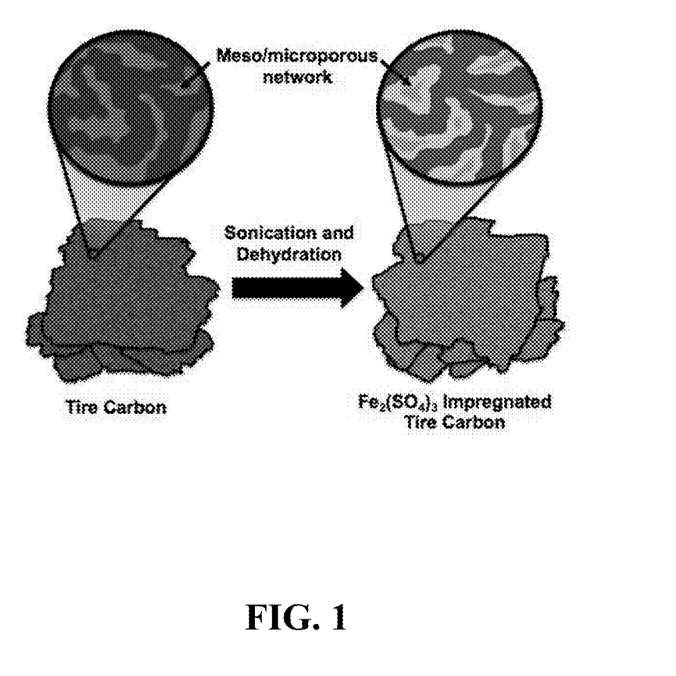
FIG. 1. Schematic of the catalyst preparation, including ferric sulfate impregnation and $H_2O$ dehydration, and the resulting morphology of the tire carbon.
Figure 2A:
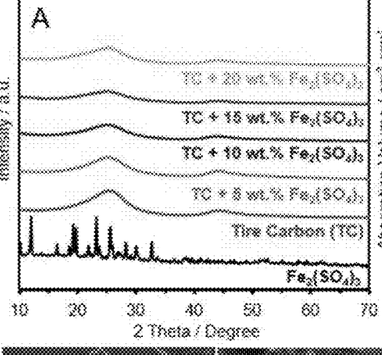
Figure 2B:
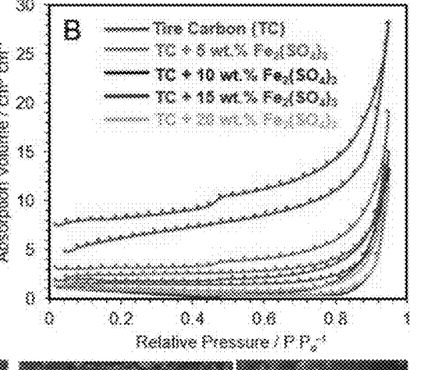

Briefly, ferric sulfate was impregnated into tire-derived carbon by ultrasonication (Branson 3800) in D.I. water for 2 h (5 mL of D.I. $H_2O$ per 1.0 g tire carbon), stirred overnight, and dehydrated in an oven at 100° C., which is schematically shown in FIG. 1. In the current study, ferric sulfate (FS) was loaded onto tire carbon (TC) in 5, 10, 15, and 20 wt. %, which are herein referred to as TC/FS-5, TC/FS-10, TC/FS-15, and TC/FS-20. Powder X-ray diffraction (XRD) analysis of the tire-derived catalysts are shown in FIG. 2A, where each catalyst shows broad diffraction peaks at 2θ=10-30° and a weaker diffraction peak at between 2θ=40-50°, which are attributed to the (002) and (101) planes within amorphous graphitic carbon. When $Fe_2(SO_4)_3$ is loaded onto tire carbon, the ferric sulfate diffraction peaks disappear, indicating that the ferric sulfate is uniformly dispersed within the pores of the carbon support. $N_2$ adsorption and desorption isotherms indicate that type IV isotherms with H1 hysteresis loops (FIG. 2B). The shape of this curve indicates that the pores in the tire carbon have an increased volume. With increased ferric sulfate loading, there is a decrease in the total adsorption volume (Table 1), suggesting that the increased ferric sulfate loading fills the pores and decreases the overall surface area of the catalyst.

TABLE 1

Textural properties of tire carbon and FS/TC catalysts.

| Sample | BET surface area ($m^2 g^{-1}$) | BJH pore volume ($cm^3 g^{-1}$) | Average pore diameter (nm) |
|---|---|---|---|
| Tire carbon (TC) | 21.13 | 0.0365 | 16.9 |
| TC/FS-5 | 7.60 | 0.0224 | 14.3 |
| TC/FS-10 | 4.37 | 0.0176 | 12.5 |
| TC/FS-15 | 2.09 | 0.0158 | 10.3 |
| TC/FS-20 | 1.29 | 0.0150 | 7.9 |

Figure 2C:
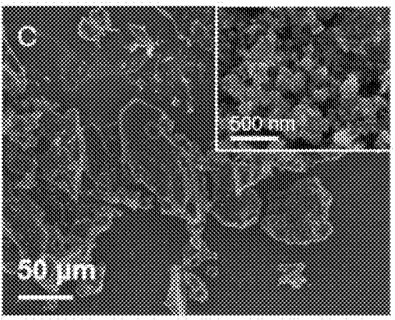
Figure 2D:
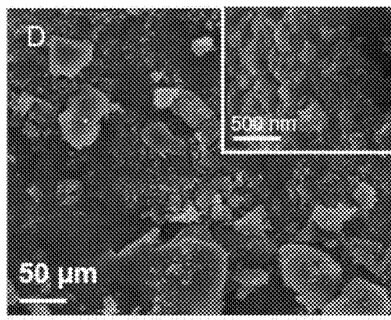
Figure 2E:
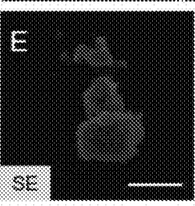
Figure 2F:
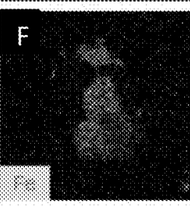
Figure 2G:
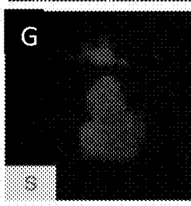
Figure 2H:
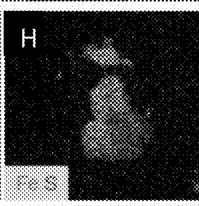

SEM analysis shows that the initial tire carbon is composed of both nano-sized and micron-sized particles (FIG. 2C), and after ferric sulfate loading, the carbon maintains similar morphology (FIG. 2D). Energy-dispersive X-ray spectroscopy (EDS) elemental mapping of TC/FS-10 shows that Fe and S are homogeneously distributed within the carbon support (FIG. 2E), suggesting that ferric sulfate is effectively loaded into the meso/micropores of the tire-derived carbon.

Surface analysis with X-ray photoelectron spectroscopy (XPS) indicates that the initial tire carbon is free from Fe, as the survey spectrum shows only peaks corresponding to C, O, and S (FIG. 3A-3E). After impregnating tire carbon with different amounts of ferric sulfate, the atomic concentration of Fe, S, and O increases linearly, as evidenced by surface analysis with XPS (Table 2).

TABLE 2

XPS surface chemistry for tire carbon-derived catalysts impregnated with ferric sulfate.

| | Atomic % | | | |
|---|---|---|---|---|
| Sample | C | O | Fe | S |
| Tire carbon (TC) | 90.5 | 9.5 | 0 | 0 |
| TC/FS-5 | 82.2 | 14.1 | 0.9 | 2.8 |
| TC/FS-10 | 77.5 | 16.6 | 1.6 | 4.3 |
| TC/FS-15 | 70.0 | 21.7 | 2.4 | 5.9 |
| TC/FS-20 | 65.0 | 25.3 | 3.0 | 6.7 |

A ferric sulfate is loaded into the pores of the tire-derived carbon, the atomic percent of carbon consistent decreases while the atomic percent of iron, oxygen, and sulfur all increase. The O1s and S2p spectra of TC/FS-10 suggest the presence of sulfate groups on the surface of the catalyst, as S=O and $SO_3^-$ groups were found to be present with the TC/FS-10 catalyst (FIG. 4A-4D). Additionally, tire carbon contains strong spin orbit doublets characteristic of thiophene, which also existed in all carbons as part of this study.

Figure 5A:
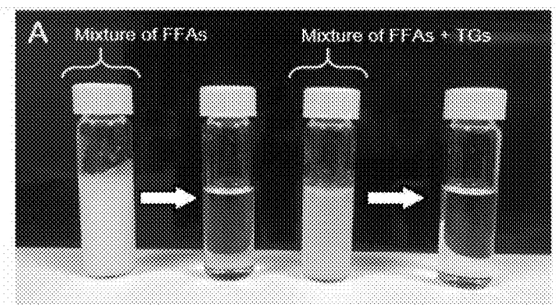
FIG. 5A-5E. 5A) Images of different feedstocks before (left of arrow) and after (right of arrow) esterification reactions with the TC/FS-10. 5B, 5C) Kinetic analysis of different tire carbon-derived catalysts (5B) and (5C) with different loading of the TC/FS-10. 5D, 5E) Oleic acid conversion for the TC/FS catalysts as a function of time with a catalyst loading of 10.0 wt. % and a methanol to oleic acid molar ratio set at 10.
Figure 5B:
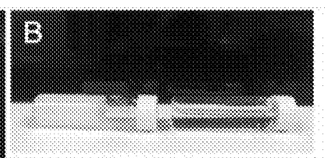
Figure 5C:
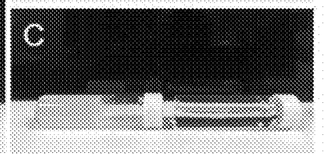
Figure 5D:
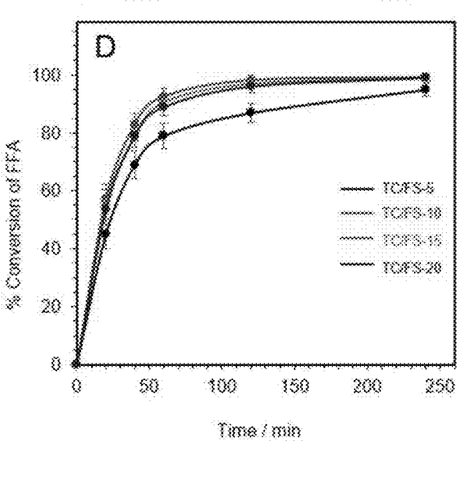
Figure 5E:
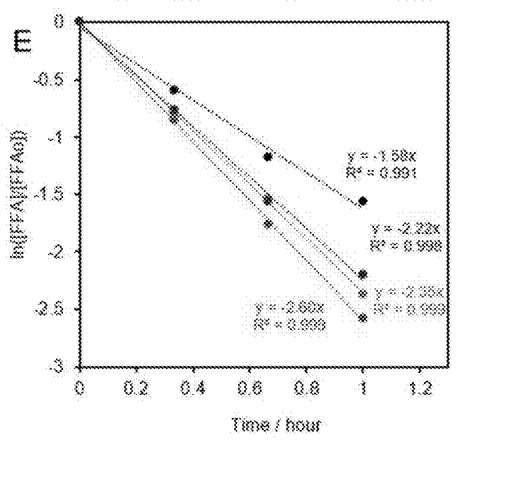

We selected oleic acid (OA), a common FFA in waste feedstocks, as a model fatty acid to probe the esterification ability for the TC/FS catalysts. OA conversion was initially performed by adding 10 mg of each TC/FS catalyst to separate reactions containing 1.1174 mL OA and 1.4326 mL methanol under reflux with an oil bath temperature at 80° C. For the formation of methyl oleate, the tire carbon catalysts with 5 wt. % of ferric sulfate achieved the lowest conversion in 4 h, while TC/FS-10, TC/FS-15, and TC/FS-20 all achieved similar catalytic activity. The conversion of OA to methyl oleate using the TC/FS catalyst was found to follow a pseudo first-order rate during the first hour of the reaction, with the greatest rate constant of 2.60 $hr^{-1}$ for the TC/FS-10 catalyst (FIG. 5D, 5E). This result suggests an intimate connection between the surface area, pore volume, and esterification rate for the TC/FS catalysts.

Figure 3A:
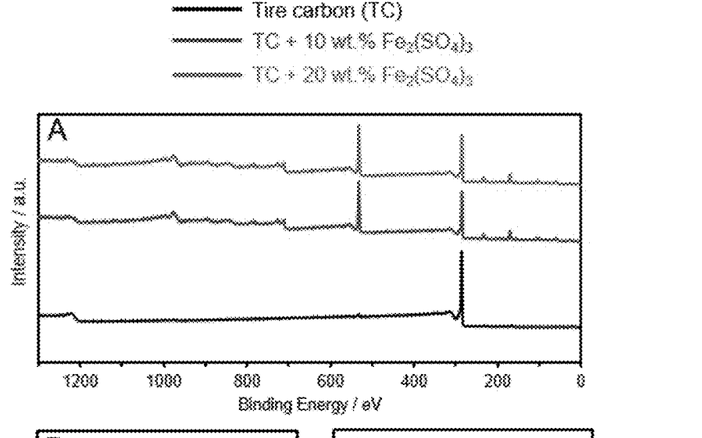
FIG. 3A-3E. X-ray photoelectron spectroscopy (XPS) spectra of the 3A) survey scans, 3B) Fe 2p region, 3C) C 1s region, 3D) O 1s region, and 3E) S 2p region for tire carbon, TC/FS-10, and TC/FS-20.
Figure 3B:
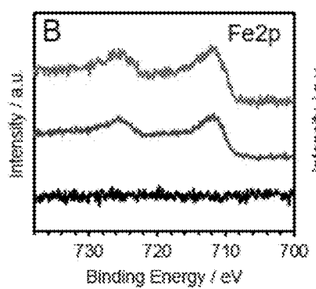
Figure 3C:
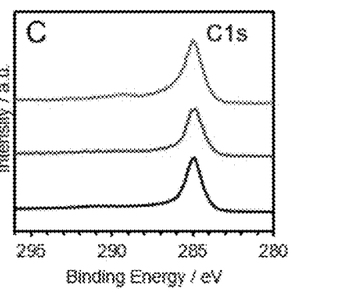
Figure 3D:
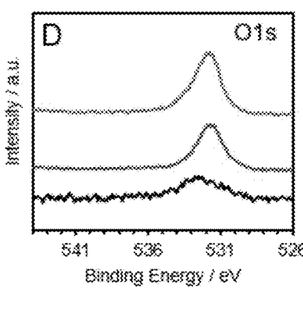
Figure 3E:
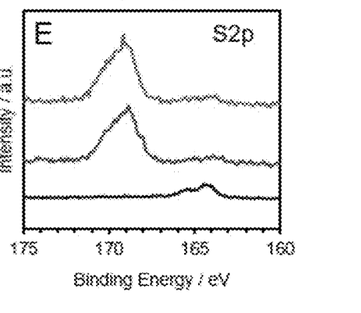
Figure 4A:
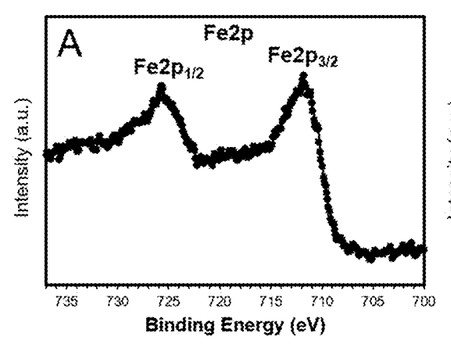
FIG. 4A-4D. XPS with labels and deconvolutions for the 4A) Fe 2p, 4B) C 1s region, 4C) O 1s region, and 4D) S 2p region for the TC/FS-10 catalyst.
Figure 4B:
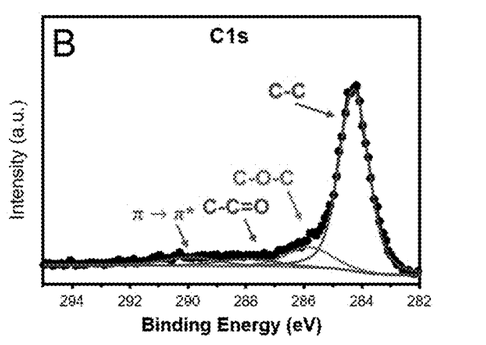
Figure 4C:
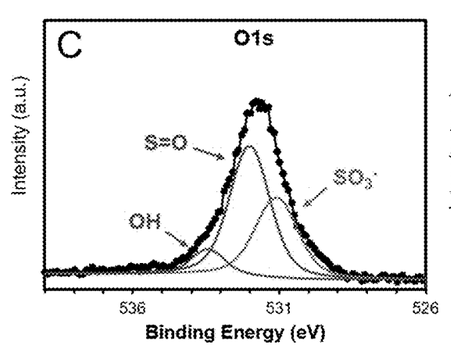
Figure 4D:
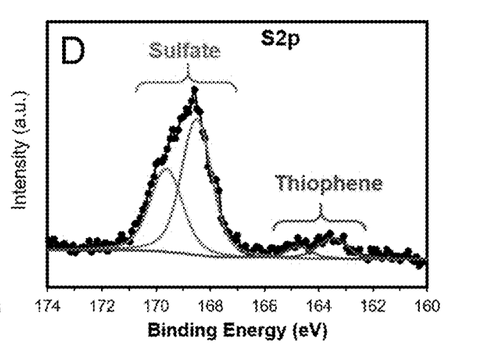
Figure 6A:
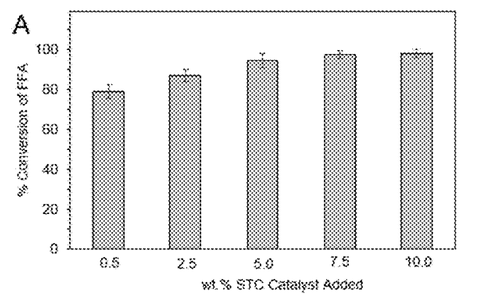
FIG. 6A-6D. Catalytic activity of TC/FS-10 with 6A) varying catalyst loading, 6B) varying the ratio of methanol to FFA, 6C) addition of water, and 6D) addition of mercury. The catalyst loading was either 10.0 or 0.5 wt. % for studies presented in B-D. The wt. % of catalyst is in terms of the FFA content and the oil bath temperature was set to 65° C. for each study.
Figure 6B:
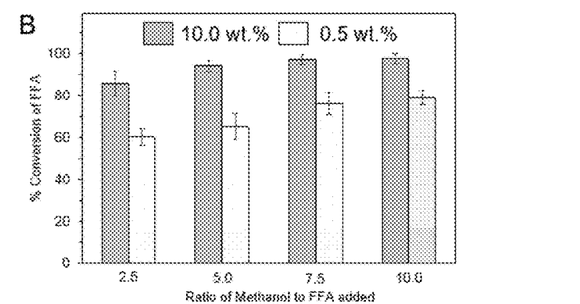
Figure 6C:
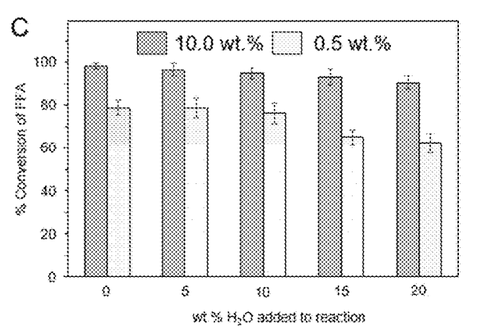
Figure 6D:
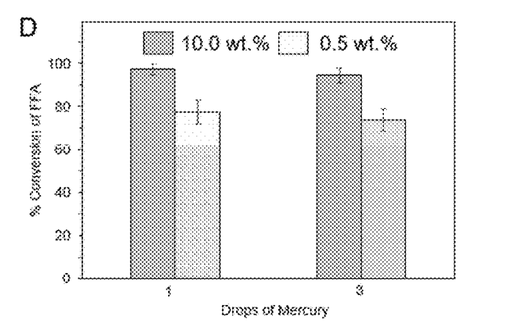
Figure 7:
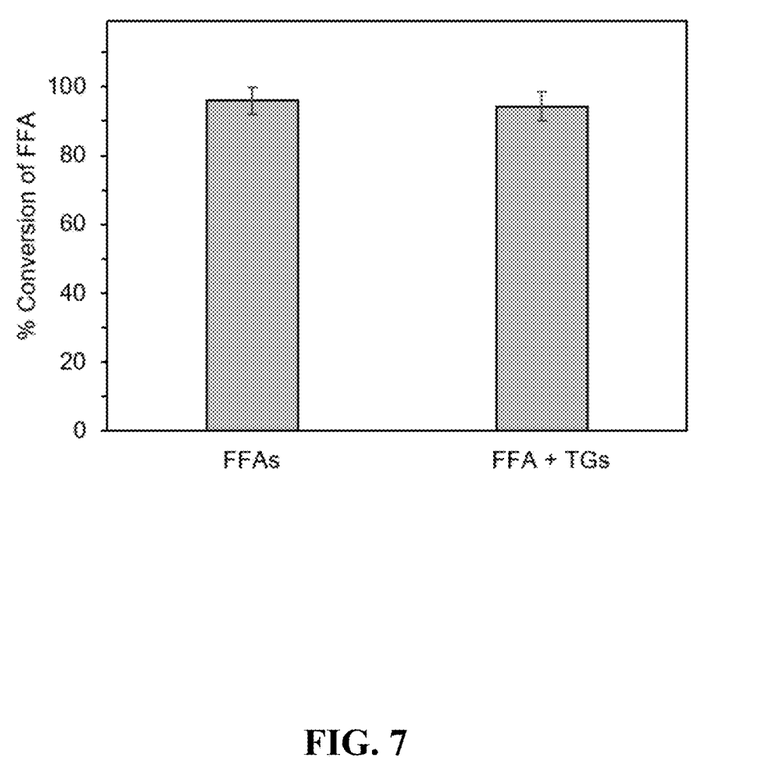
FIG. 7. Percent conversion of a pure mixture of FFAs (19.5% palmitic acid, 6.0% stearic acid, 35.4% oleic acid, and 38.2% linoleic acid) and in a 1:1 mixture of FFAs (in the same ratio) with soybean oil. The TC/FS-10 catalyst was maintained at 10.0 wt. % in terms of FFA content for all reactions, and 10.0 equivalents of methanol were added in terms of the FFA content for each reaction. These results suggest that the TC/FS-10 catalyst can convert a mixture of FFAs, similar to those found in waste feedstocks, to FAMEs, even in the presence of triglycerides.

Further experiments were performed for the TC/FS-10 catalyst to assess the optimal esterification conditions for the TC/FS-10 catalyst. First, the amount of catalyst added to the esterification reaction was varied from 0.5 to 10.0 wt. % in terms of the OA content. Using 10.0 wt. % TC/FS-10 in terms of FFA content and a methanol to OA molar ratio of 10, greater than 98% of OA was converted to methyl oleate after 4 hours (FIG. 6A-D). When decreasing the catalyst content to 0.5 wt. % and using the same reaction conditions, ~79% of the OA was converted to methyl oleate in 4 h. Decreasing the methanol to FFA molar ratio also decreases the conversion of OA to methyl oleate, which is more apparent when 0.5 wt. % of TC/FS-10 was used as catalyst (FIG. 3B). Under an optimized catalyst loading and proper methanol to OA molar ratio, TC/FS-10 can achieve a conversion of OA to methyl oleate of >98%. Using these same optimized conditions, a mixture of FFAs was fabricated (FIG. 5A, 5B) to simulate waste cooking oil (19.5% palmitic acid, 6.0% stearic acid, 35.4% oleic acid, and 38.2% linoleic acid). Using 10.0 wt. % of TC/FS-10 and 10.0 equivalents of methanol in terms of FFA content, TC/FS-10 converted >95% of the FFAs to FAMEs, suggesting that this catalyst can be used for a wide range of FFAs (FIG. 7).

Figure 8:
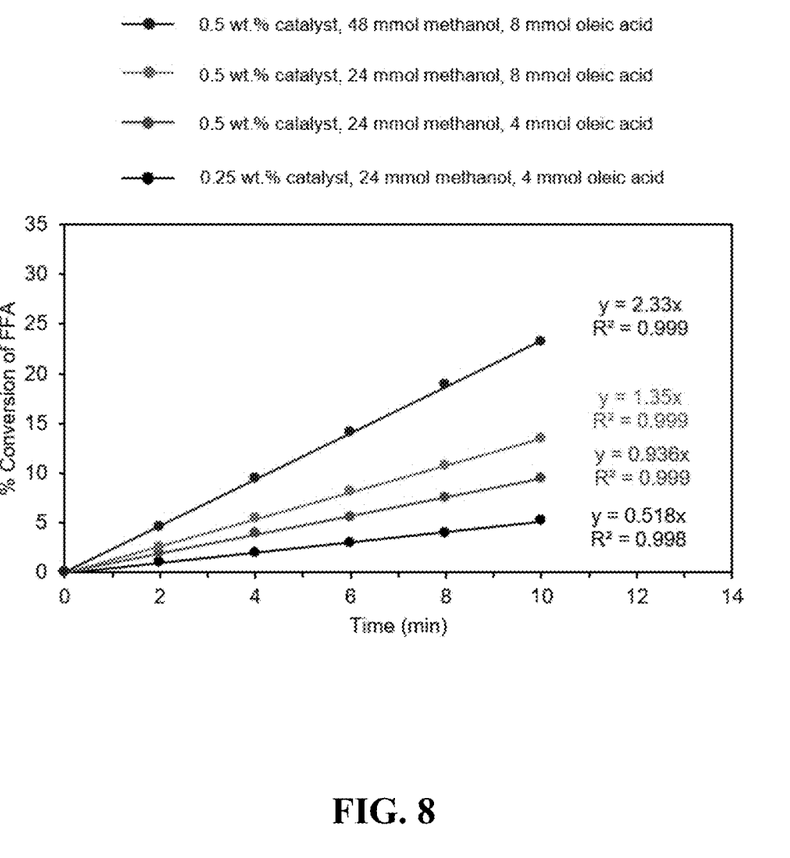
FIG. 8. Kinetic evaluation of oleic acid to methyl oleate conversion using the TC/FS-10 catalyst. The catalyst content, oleic acid concentration, and methanol concentration are noted at the top of the Figure. The methanol and oleic acid were preheated for 15 minutes at 80° C. for each reaction, and then TC/FS-10 was charged into the reaction flask at time t=0 min. The wt. % of the catalyst is in terms of FFA content. The initial reaction rates are noted in the Table 3.

The kinetics of esterification of TC/FS-10 was further explored under conditions where limitations due to mass transport could be minimalized. In homogenous esterification, such as that with sulfuric acid, the reaction typically follows second-order reaction kinetics. In heterogeneous catalysis, the catalysis mechanism is generally more complex due to surface-adsorbate interactions between the catalyst, reactants, and products. For this reason, the reaction order was determined by varying the methanol to OA molar ratio with decreased catalyst loadings (0.25-0.50 wt. %) at 65° C. and monitoring the reaction during the first 10 min since <25% of the OA is converted to methyl oleate in this region (FIG. 8). The initial reaction rates for the TC/FS-10 catalyst are presented in Table 3, where the concentration of catalyst, methanol, and OA all had a positive effect on the esterification rate.

TABLE 3

Initial reaction rates for TC/FS-10 with varying concentrations of catalyst, methanol and oleic acid, with a reaction temperature at 65° C.

| Wt. % catalyst | [oleic acid$_0$] (mmol) | [methanol$_0$] (mmol) | $r_0$ (mM/min) |
|---|---|---|---|
| 0.25 | 4 | 24 | 14.5 |
| 0.5 | 4 | 24 | 26.3 |
| 0.5 | 8 | 24 | 37.9 |
| 0.5 | 8 | 48 | 65.5 |

Figure 9:
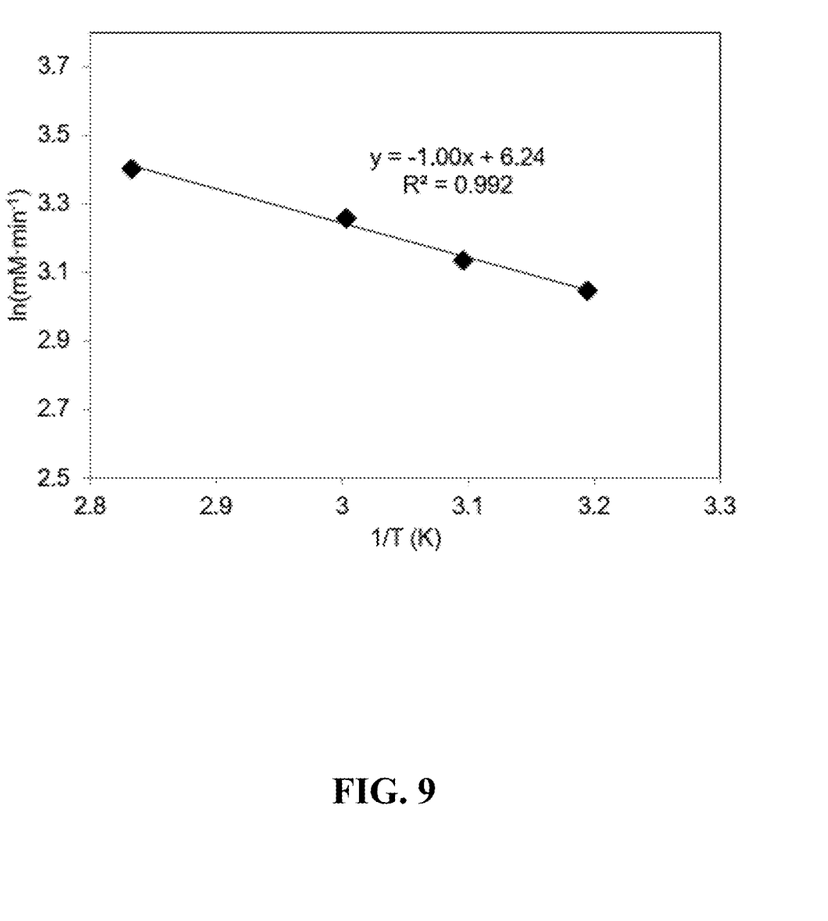
FIG. 9. Arrhenius activation energy analysis for the TC/FS-10 catalyst between 40-80° C. The initial reaction rates were collected using 0.5 wt. % of catalyst (in terms of oleic acid content) and a methanol to oleic acid molar ratio of 10.0.

The apparent reaction orders were determined to be 0.69 with respect to methanol, 0.53 with respect to oleic acid, and 0.86 with respect to the TC/FS-10. The Arrhenius plot for TC/FS-10 yields a linear plot from T=40-80° C., corresponding to an activation energy of 4.6±0.3 kcal/mol (FIG. 9). Though linearity indicates that mass transport limitations were minimized, the relatively low boiling point of methanol and the fact that there was some curvature in OA conversion collected at higher temperatures suggests that mass transport effects cannot be completely ruled out for heterogeneous esterification using TC/FS-10.

Mercury poisoning experiments were performed to evaluate the heterogeneous nature of the TC/FS-10 catalyst. It is well established that mercury suppresses the catalytic activity of a homogenous and colloidal catalysts by adsorbing the catalytic species. Upon adding 1 and 3 drops of mercury to reactions containing 10.0 wt. % TC/FS-10, the conversion of OA to methyl oleate was retained at 95-98% after reacting for 4 hours, representing a modest reduction in catalytic activity (FIG. 6D). This result suggests TC/FS-10 performs heterogeneous catalysis for FFA to FAME conversion, and more importantly, suggests that the ferric sulfate is strongly supported by the tire carbon during esterification reactions.

Figure 10A:
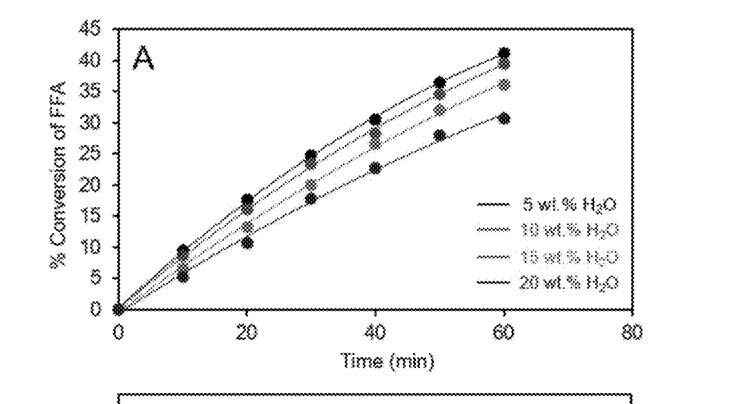
FIG. 10A-10B. 10A) Water sensitivity of the esterification of oleic acid by 0.5 wt. % TC/FS-10 at 65° C. 10B) Catalytic activity of 10.0 wt. % TC/FS-10 towards converting oleic acid to methyl oleate in the presence of triglycerides from soybean oil at 65° C.

Since water and triglycerides (TGs) are typically present in high concentrations in many cheap FFA-rich feedstocks, it is critical to evaluate the effect of $H_2O$ and TGs on TC/FS-10. Previously, $H_2O$ was found to significantly inhibit the catalytic activity of homogenous catalysts like $H_2SO_4$. Many heterogeneous catalysts used in esterification, like Amberlyst-15 and $SO_4^{2-}/ZrO_2$, have poor water resistivity, which is evident by a sharp decrease in their catalytic activity. To evaluate the water sensitivity of TC/FS-10 towards esterification, different contents of D.I. $H_2O$ (0-20 wt. % in terms of FFA content) were added to reactions containing 10.0 wt. % of TC/FS-10 catalyst could convert >90% of OA to methyl oleate (FIG. 6C). Using the same reaction conditions but 0.5 wt. % TC/FS-10, the effect of $H_2O$ was more pronounced, where a ~25% decrease in catalytic activity was observed when 20 wt. % of $H_2O$ was added to the reaction (FIG. 10A). Previous studies detailing water deactivation of heterogeneous catalysts suggest similar deactivation mechanisms as homogenous catalysts, where water decreases the acid strength of the Brønsted- or Lewis-type active sites. Still, TC/FS-10 maintains good catalytic activity in the presence of large quantities of water, which is especially important since the water is the byproduct of esterification.

Figure 10B:
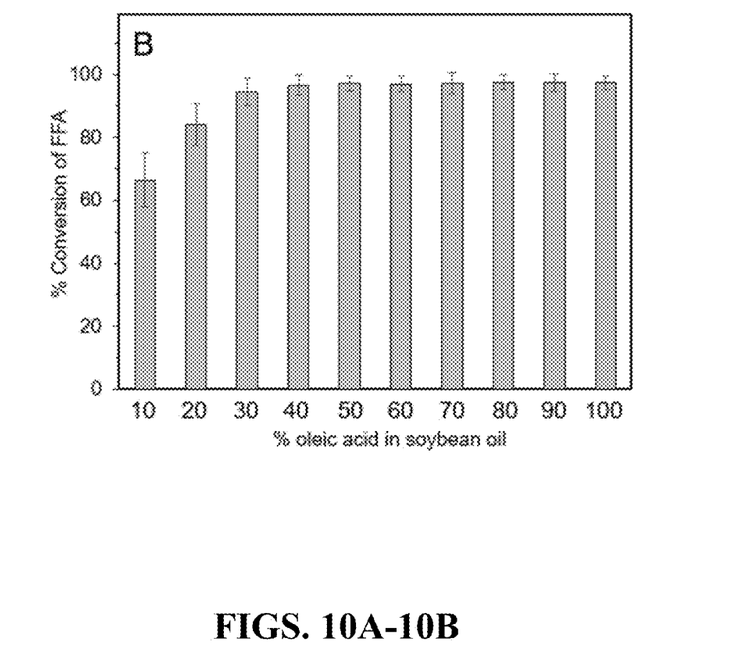

The sensitivity of TC/FS-10 towards esterification in the presence of TGs was also evaluated by using soybean oil (SO) as the TG source (FIG. 10B). Previous studies clearly show that ferric sulfate is deactivated by TGs, and the phase separation between TGs and FFAs hinders the ability of the catalyst to perform esterification reactions. In feedstocks with ≥30% OA in TGs, TC/FS-10 achieved conversions of >95% for OA to methyl oleate. In feedstocks with low concentrations of OA (<30%) and high concentrations of TGs (>70%), the percent conversion was found to decrease, possibly due to the decreased catalyst loading since catalysts were added in terms of the initial OA content in the reaction. When TGs and a mixture of FFAs (19.5% palmitic acid, 6.0% stearic acid, 35.4% oleic acid, and 38.2% linoleic acid) were used as the feedstock (FIG. 5A, 5C), TC/FS-10 maintained high catalytic activity towards esterification, achieving >95% conversion of the FFAs to FAMES (FIG. 7). These reactions demonstrate that ferric sulfate can be loaded onto the micro/mesoporous tire carbon support and maintain practical catalytic activity in the presence of TGs.

Figure 11A:
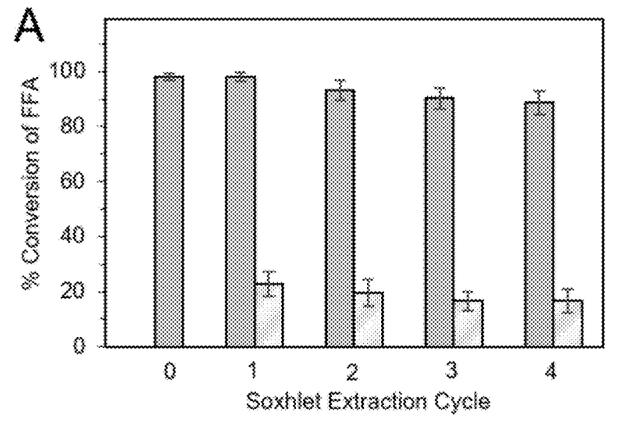
FIG. 11A-11C. 11A) Recyclability experiments of the TC/FS-10 catalyst (10.0 wt. %) and leachate solutions after four Soxhlet extractions with methanol. 11B) XPS of the Fe 2p and 11C) S 2p regions of the TC/FS-10 catalyst after each Soxhlet extraction, highlighting the retention of ferric sulfate on the surface of tire carbon.
Figure 11B:
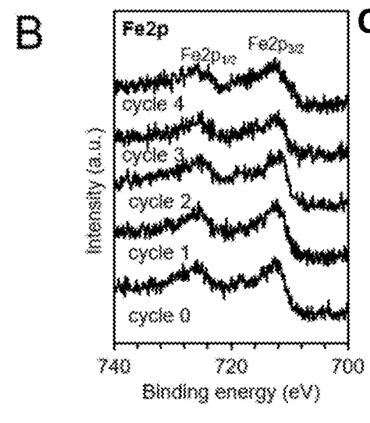
Figure 11C:
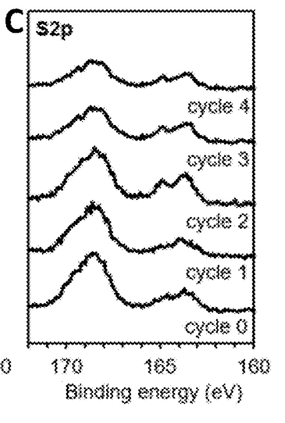

In many cases, the active sites of solid acid catalysts will leach to the reaction mixture, which often leads to decreased catalytic activities and incorrect conclusions as to homogeneous versus heterogeneous catalysis. To explore the retention of the catalytic ability of TC/FS-10, TC/FS-10 catalyst was subjected to four Soxhlet extractions with methanol, and the catalytic activity was evaluated for both the solid catalyst and the leachate. TC/FS-10 converted >98% of OA to methyl oleate, and after four extractions with methanol, the TC/FS-10 catalyst achieved conversions of >90% for esterification using the same reaction conditions (FIG. 11A). When the TS/FS-10 catalyst was exchanged for 1.000 mL of the leachate from Soxhlet extraction, conversions of ~15-20% were observed, which are comparable to those when no catalyst is present. To understand the retention of catalytic activity, the surface of the TC/FS-10 catalyst after different cycles was evaluated using XPS (FIG. 11B). The Fe2p and S2p spectra for the TC/FS-10 catalysts clearly how a retention in surficial Fe and sulfate groups, which are responsible for the esterification. The atomic percentage of surficial C, O, Fe, and S are also similar after methanol extraction, further supporting the retention of catalytic ferric sulfate species (Table 4).

TABLE 4

XPS surface chemistry for tire carbon-derived catalysts impregnated with ferric sulfate.

| Sample | Atomic % | | | |
|---|---|---|---|---|
|  | C | O | Fe | S |
| TC/FS-10 pristine | 77.5 | 16.6 | 1.6 | 4.3 |
| TC/FS-10 leach 1x | 77.5 | 16.9 | 1.5 | 4.1 |

TABLE 4-continued

XPS surface chemistry for tire carbon-derived catalysts impregnated with ferric sulfate.

| Sample | Atomic % | | | |
|---|---|---|---|---|
| | C | O | Fe | S |
| TC/FS-10 leach 2x | 77.6 | 17.0 | 1.5 | 3.9 |
| TC/FS-10 leach 3x | 77.7 | 17.3 | 1.4 | 3.6 |
| TC/FS-10 leach 4x | 77.8 | 17.5 | 1.3 | 3.4 |

In summary, it was demonstrated that ferric sulfate can be easily impregnated into meso/microporous tire carbon through straightforward ultrasonication and dehydration procedures. Tuning the amount of ferric sulfate loaded into the pores of the tire carbon achieved ideal surface areas for catalysis, where 10 wt. % of ferric sulfate yielded catalysts with enhanced kinetics towards FFA esterification when compared to other ferric sulfate loadings. These catalysts efficiently convert feedstocks that are rich in FFA content to FAMEs, even in the presence of decreased concentrations of methanol, increased concentrations of triglycerides, or relatively high water content.

Waste tire-derived carbon is an ideal carbon support for catalytically active ferric sulfate for a number of reasons. First, waste tires are non-biodegradable, which causes health and environmental issues. When pyrolyzed using newly developed methods, waste tire-derived carbon holds a meso/microporous structure that allows for ferric sulfate to be efficiently loaded into the pores which, without wishing to be bound by theory, provides Lewis acid sites for esterification reactions to occur on the surface and within the pores of the carbon support. Since ferric sulfate has poor solubility in oil and is sparingly soluble in methanol, it is critical to load ferric sulfate onto supports that can allow for both the catalysis and separation of the catalyst and resulting products. It is believed that the large meso/micropores of the tire carbon allows for the esterification of large molecules, such as FFAs, to take place on the catalyst superstructure, allowing for desirable kinetics for esterification reactions.

This invention can be embodied in other forms without departing from the spirit or essential attributes thereof, and accordingly, reference should be had to the following claims to determine the scope of the invention.

What is claimed is:

1. A catalyst comprising a porous carbon composite, wherein the carbon composite comprises pores with a BJH pore volume between 0.0100 $cm^3$ $g^{-1}$ to less than 0.1000 $cm^3$ $g^{-1}$, the catalyst further comprising ferric sulfate dispersed within the pores of the carbon composite, the ferric sulfate being 5-20 wt. % based on the total weight of the catalyst.

2. The catalyst according to claim 1, wherein the carbon composite contains a mixed meso-microporosity.

3. The catalyst according to claim 1, wherein the carbon composite has a specific surface area of between 1-2000 $m^2/g$.

4. The catalyst according to claim 1, wherein the carbon composite has a maximum BJH pore volume of 0.0365 $cm^3$ $g^{-1}$.

5. The catalyst according to claim 1, wherein the carbon composite is derived from waste tires.

6. The catalyst according to claim 1, wherein the anion component of the salt is present on the surface of the porous carbon composite.

7. The catalyst according to claim 1, wherein the catalyst comprises 10-20 wt. % ferric sulfate.

8. The catalyst according to claim 1, wherein the catalyst comprises 5-15 wt. % ferric sulfate.

9. The catalyst according to claim 1, wherein the ferric sulfate is uniformly dispersed within the pores.

10. The catalyst according to claim 1, wherein sulfur comprises 3.4-4.3 atomic % of the catalyst.

* * * * *